United States Patent [19]

Evans

[11] Patent Number: 4,797,266
[45] Date of Patent: Jan. 10, 1989

[54] METHOD OF PREPARATION OF A COMBINED ZSM-5-FERRIERITE ALUMINOSILICATE

[75] Inventor: Wayne E. Evans, Houston, Tex.

[73] Assignee: Shell Oil Company, Houston, Tex.

[21] Appl. No.: 894,164

[22] Filed: Aug. 7, 1986

[51] Int. Cl.$^4$ .......................................... C01B 33/28
[52] U.S. Cl. .................................................. 423/328
[58] Field of Search ...................... 423/328, 329, 330; 502/67, 162

[56] References Cited

U.S. PATENT DOCUMENTS

| | | | |
|---|---|---|---|
| 3,702,886 | 11/1972 | Argauer et al. | 423/328 |
| 4,016,245 | 4/1977 | Plank et al. | 423/328 |
| 4,251,499 | 2/1981 | Nanne et al. | 423/329 |
| 4,296,083 | 10/1981 | Rollmann | 423/329 |
| 4,343,692 | 8/1982 | Winquist | 208/111 |
| 4,390,457 | 6/1983 | Klotz | 252/455 |
| 4,495,166 | 1/1985 | Calvert et al. | 423/329 |
| 4,578,259 | 3/1986 | Morimoto et al. | 423/329 |
| 4,613,488 | 9/1986 | Van Erp et al. | 423/328 |
| 4,663,140 | 5/1987 | Van Erp et al. | 423/328 |

OTHER PUBLICATIONS

I. D. Harrison et al., "Comparison of the Shape Selective Properties of Ferrierite, ZSM-5 and ZSM-11", Zeolites, vol. 7, No. 1, Jan. 1987, pp. 21-27.

Primary Examiner—Robert L. Stoll
Assistant Examiner—R. Bruce Breneman
Attorney, Agent, or Firm—Kimbley L. Muller

[57] ABSTRACT

A method of preparation of a combined ZSM-5 and ferrierite aluminosilicate is disclosed utilizing a crystallization admixture comprising sodium silicate, a compound of aluminum, sodium oxide, water and a combination of amines comprising piperidine and an aliphatic amine selected from the group of n-butylamine and tetrapropylammonium hydroxide. The latter chosen amine is directive for a ZSM-5 aluminosilicate while the former is directive for a ferrierite aluminosilicate. Examination by Scanning Electron Microscope (SEM) demonstrates a different catalyst morphology than a catalyst synthesized using silica gel and pyridine. The resultant catalyst is useful in the dewaxing of lubricating oils, especially those oils not necessarily treatable by a unitary ferrierite or a unitary ZSM-5 catalyst.

7 Claims, 1 Drawing Sheet x 3000 x 10.000 x 3000 x 10.000

METHOD OF PREPARATION OF A COMBINED ZSM-5-FERRIERITE ALUMINOSILICATE

FIELD OF INVENTION

This invention concerns a method of preparing a unique product useful as a catalyst having properties similar to the advantageous qualities of both ZSM-5 and ferrierite aluminosilicates but which together do not appreciably suffer from the disadvantages common to both. Aluminosilicate catalytic compositions of matter with selective uniform pore size have been sought for the conversion of hydrocarbonaceous materials to produce other hydrocarbonaceous materials of more desirable qualities. Research energies have been expended to develop zeolites of particular pore size to adequately treat various hydrocarbon feedstocks. One type of aluminosilicate developed in the late 1960's is commonly referred to as a ZSM-5-type aluminosilicate catalyst, which is defined by its X-ray diffraction pattern in U.S. Pat. No. 3,702,886. Another type of aluminosilicate, as exemplified by U.S. Pat. No. 4,016,245, was developed to have uniform select pores smaller than ZSM-5 and is commonly referred to as a ferrierite aluminosilicate. All of the teachings of these patents are herein incorporated by reference. Yet another type of zeolite developed previous to ZSM-5 is a mordenite-aluminosilicate having pore sizes greater than that of ZSM-5.

Refiners and catalyst manufactures have long sought the most viable method of manufacture to prepare these particular types of aluminosilicates. The field of this invention is directed to a mutant type aluminosilicate, useful at least in part as a catalyst, which will possess properties not common to ZSM-5 and ferrierite aluminosilicates. The product of this invention will advantageously catalytically convert hydrocarbonaceous feed materials which either of these particular type aluminosilicates, when used as catalysts per se, could not viably convert to better quality hydrocarbon materials.

It has been determined that pyrrole, an unsaturated $C_5$ heterocyclic nitrogen compound, when used in an aqueous gelling admixture with silica, alumina, sodium oxide and water will direct the resultant product to a mordenite aluminosilicate material. If this nitrogen containing directive is modified only slightly to n-butylamine or tetrapropylammonium hydroxide, a ZSM-5 aluminosilicate will be formulated. In furtherance of the unpredictable effect of the nitrogen template director, if pyrrole is interchanged with a saturated $C_5$ heterocyclic nitrogen, i.e. pyrrolidine, the aqueous gel mixture will crystallize to form a ferrierite aluminosilicate. This is shown in U.S. Pat. No. 4,016,245, which also surprisingly discloses that the aliphatic amine ethylenediamine is a ferrierite directive nitrogen compound. Modification of the saturated $C_5$ heterocyclic nitrogen to the saturated $C_6$ heterocyclic nitrogen, i.e. piperidine, results in a ferrierite catalyst. See Winquist et al U.S. Pat. No. 4,343,692. It is evident from these very divergent teachings that modification of one nitrogen containing compound for another even analogous nitrogen containing compound can unpredictably result in a totally different and unexpected composition of matter. There simply does not appear to be any rationale or predictibility of what type of catalyst or aluminosilicate will be derived utilizing one particular nitrogen directive compound. In summary, this area of technology is very unpredictable.

BACKGROUND OF THE INVENTION

A method of preparing crystalline aluminosilicates was disclosed in Klotz, U.S. Pat. No. 4,390,457 where the crystallizing gel is formed by an aqueous admixture of an oxide of aluminum, an oxide of silicon, a metal or ammonium cation and 2-aminopyridine. Recognition is made at column 2, line 45+ that different organic nitrogen compounds will direct the crystallization to different aluminosilicate materials. For instance, ethylenediamine, pyrrolidine or butylenediamine will provide a ferrierite-like material in contrast to tetra alkyl ammonium salts and primary alkyl amines which will provide a ZSM-5 composition. The crystalline forms attained by using the 2-aminopyridine include mordenite and ferrierite-aluminosilicate forms and exhibit properties of aluminosilicates of the ZSM-4 and ZSM-5 families. It is necessary in order to acquire this admixture that ammonium cations be used in conjunction with the organic template compound. Substitution of the 2-aminopyridine in the crystallizing admixture with aliphatic amines or alkylene diamines is disclosed in U.S. Pat. No. 4,495,166, Calvert. The resultant aluminosilicate is a ZSM-5 or ZSM-11 zeolite.

In U.S. Pat. No. 4,296,083, Rollmann, an improved method for synthesizing crystalline zeolites is disclosed from a reaction mixture containing one or more alkali metal oxide, organic nitrogen-containing cations, hydrogen ions, an oxide of silicon, water and an oxide of aluminum. Depending on the selected ingredients any zeolite can be prepared having a classification of ZSM-5, ZSM-11, ZSM-12, ZSM-23, ZSM-35 and ZSM-38. The source of the organic nitrogen cations can be from a primary, secondary or tertiary amine or a quaternary ammonium compound. Examples of these amines include some heterocyclic amines such as pyridine or piperidine. There is no disclosure or recognition of what type of zeolite would be prepared by substituting the piperidine of the latter disclosure for any of the aliphatic amines described in Calvert et al U.S. Pat. No. 4,495,166. In fact, the disclosure of the latter reference, while teaching that cyclic amines may be available for this type of crystallization gel, indicates that the preferred amines are represented by aliphatic amines having 2 to 8 carbon atoms. In addition, this disclosure indicates that the substitution of one amine for another amine would still result in the preparation of a single type of crystalline aluminosilicate in contrast to the instant invention which produces a mixture of two crystalline aluminosilicates. Finally, a ZSM-5 composition is prepared in Argauer et al, in U.S. Pat. No. 3,702,886, by a solution containing tetrapropylammonium hydroxide, sodium oxide, an oxide of aluminum or gallium, an oxide or silica or germanium and water. The prior art has failed to appreciate the preparation of the instant two conjunct crystalline aluminosilicates having advantageous properties of both ferrierite and ZSM-5 while not being constrained by the disadvantageous aspects of each of those respective species.

OBJECTS AND EMBODIMENTS

It is therefore an object of this invention to provide a high quality combinative mixture of ZSM-5 and ferrierite aluminosilicates, which can be transformed into catalysts having the adaptability to catalytically treat certain hydrocarbons to modify same the hydrocarbons of higher desired quality.

Another object of this invention is to provide a viable crystallization recipe of materials which will derive a high quality unique mixture of ZSM-5 and ferrierite aluminosilicates in a time-efficient method.

Another object of this invention is to provide a crystallizing mixture in an aqueous medium having specific components of sodium silicate, alumina, and two nitrogen directive agents, one of which is piperidine and one of which is selected from n-butylamine and tetrapropylammonium hydroxide.

Another object of this invention is to provide a method of preparation to arrive at an aluminosilicate which can be transformed into a catalyst which is viable to dewax a certain substrate of lubricating oils not advantageously treated by either a ZSM-5 or ferrierite-aluminosilicate zeolite catalyst.

Another object of this invention is to provide a process for dewaxing a lubricating oil having a specified viscosity index which is more advantageously treated with the employment of a catalyst derived from a crystallization recipe comprising sodium silicate, alumina, water, piperidine and n-butylamine or tetrapropylammonium hydroxide.

An embodiment of this invention resides in a method for the preparation of a combined mixture of a ZSM-5 and ferrierite aluminosilicate which comprises crystallizing at a temperature of 125° C. to 225° C., and a pressure of about 1 atmosphere to 50 atmospheres for a period of time sufficient to cause crystallization comprising 5 hours to about 200 or more hours of an aqueous crystallization admixture comprising sodium silicate, a compound of aluminum, sodium oxide, water and a combination of amines comprising piperidine and an aliphatic amine selected from the group consisting of n-butylamine and tetrapropylammonium hydroxide, wherein said components are present in a content expressed by: silica:alumina:sodium oxide:water:total amine content equal to 25:XXX:YYY: 350-2000:3-20 wherein XXX is equal to 0.1 to 2.0, YYY is equal to 0.2 to 10 and the ratio of piperidine to the chosen aliphatic amine is equal to 0.1 to 20.

Yet another embodiment of this invention resides in a method for the preparation of an aluminosilicate catalyst precursor which comprises crystallizing an aqueous solution of sodium silicate, a compound of aluminum, sodium hydroxide, water, piperidine and n-butylamine in a ratio of 25:XXX:YYY:350-2000:3-20 wherein XXX is equal to 0.1 to 2.0 and YYY is equal to 0.2 to 5.0 wherein the sodium silicate quantity is calculated in the oxide form, i.e. silica and the aluminum compound is calculated in the oxide form, i.e. alumina.

Yet another embodiment of this invention resides in a method for dewaxing a lubricating oil having undesirable wax content therein and having a viscosity in the range of 10 cp to about 80 cp (measured at 40° C.) which comprises contacting said wax-containing lubricating oil at dewaxing conditions with a catalyst derived from the product of an aqueous crystallizing solution comprising sodium silicate, a compound of aluminum, sodium oxide, water, and a combination of amines comprising piperidine and an aliphatic amine selected from the group consisting of n-butylamine and tetrapropylammonium hydroxide.

BRIEF DESCRIPTION OF THE INVENTION

This invention is concerned with a novel recipe for crystallization of a novel aluminosilicate comprising a mixture of both ZSM-5 and ferrierite aluminosilicates prepared from an aqueous gel recipe inclusive of sodium silicate, a compound of aluminum, sodium oxide, water, piperidine and either n-butylamine or tetrapropylammonium hydroxide. The catalyst derived from this aluminosilicate has been found to be particularly useful to treat difficult lubricating oils of specific viscosity, i.e. HVI 100 to 250. The derivation of the ultimate catalyst from the prepared aluminosilicates can be performed by calcination followed by any known technique to substitute the sodium ions of the prepared aluminosilicate by acidic hydrogen ions. One typical example of this type of substitution is ion exchange of the prepared aluminosilicate with ammonium nitrate followed by calcination to replace nearly all the sodium ions with hydrogen ions.

DETAILED DESCRIPTION OF THE INVENTION

A catalyst derived from the above ion exchange of an aluminosilicate produced by the instant invention provides for more viable treatment of some specific hydrocarbonaceous materials such as dewaxing of an HVI 100 to 250 lubricating oil. It has been found that the resultant aluminosilicate has a crystallinity, as defined by its X-ray powder diffraction pattern, of about 25% higher than that of an aluminosilicate derived from an aqueous solution where analogous pyridine is substituted for piperidine. The aluminosilicate surface area of the piperidine derived material, as determined by low partial pressure nitrogen sorption BET, is also increased by about 25%. Analysis utilizing scanning electron microscopy (SEM) indicates that the morphology of the aluminosilicate derived from this aqueous recipe is greatly altered by the substitution of piperidine for pyridine. The instant FIGS. 1, 1A, 2 and 2B highlight this difference. The dewaxing performance capabilities of the catalyst derived from this aluminosilicate are substantially improved with as much as from 7 to 22 times greater activity when compared to dewaxing with another prepared catalyst for an HVI 100 lubricating oil, and as much as 70 times greater activity when dewaxing an HVI 250 viscosity oil.

Many methods have been shown to prepare a ZSM-5 type aluminosilicate one of which is exemplified by Argauer in U.S. Pat. No. 3,702,886. In Plank et al, U.S. Pat. No. 4,016,245, a crystallizing recipe is disclosed for the preparation of a ferrierite material having a specific X-ray diffraction pattern utilizing either of two nitrogen directive components, i.e, ethylenediamine or pyrrolidine.

It has been discovered that some aluminosilicates are not totally sufficient to dewax lubricating oils having different types of wax content. It appears that one aluminosilicate catalyst will not universally dewax all types of lube oils. This is believed to be resultant from the fact that larger molecule size waxes enter and undergo hydrocracking in the channels of some zeolites but will not be permitted to enter the channels of the zeolites having smaller pores. The corollary of this is true; zeolites with smaller pores will selectively treat waxes of smaller molecular size more effectively vis-a-vis zeolites of larger pore size. The instant catalyst prepared by this method offers a catalyst to dewax a specific type of lubricating oil, with catalytic behavior far surpassing those of large or small pore size zeolites.

This invention brings forth for the first time the discovery that sodium silicate, as a silicon source, is evidently superior to the use of silica gel as an initial additive to the aqueous crystallizing gel. This invention also brings forth for the first time the discovery that use of piperidine, as a ferrierite-directing amine template, results in a superior zeolite as compared to the type of zeolites derived utilizing pyrrolidine or pyridine. The component of the gel admixture required to direct crystallization to a zeolite at least partially representative of a ZSM-5 zeolite is an aliphatic amine, such as tetrapropylammonium hydroxide (TPAH) or n-butylamine. While either of these materials or any mixture thereof can be used interchangeably in this invention to achieve substantially the same result, it is preferred to use n-butylamine as a result of its cost, about 1%, of that of tetrapropylammonium hydroxide.

As in any crystallizing solution, the quantity and type of reagents present in solution are critical to obtaining the desired crystalline aluminosilicate. The components of the crystallizing admixture are sodium silicate/a compound of aluminum/sodium oxide/water and amines comprising piperidine and an amine selected from the group consisting of n-butylamine and tetrapropylammonium hydroxide. These components should be present in the following ratio: silica 25, alumina 0.1 to 2.0, sodium oxide 0.2 to 10, water 350 to 2000 and total amine content of 3 to 20. Even though the sodium silicate and aluminum compound are added in a salt form, they are identified by quantity in the oxide form. The total amine components are considered as the summation of the chosen n-butylamine or tetrapropylammonium hydroxide augmented to the piperidine. The ratios of these two components aliphatic to heterocyclic amine is contemplated to be of 0.1 to about 1000. Also the preferred quantity of aluminum, expressed as moles of alumina per 25 moles of silica, in this gel recipe is between 0.20 and 0.80 while the preferred quantity of sodium oxide is between 0.5 and 5.0 moles per 25 moles of silica. The alumina can be formed by the presence of an $Al^{+3}$ salt such as aluminum sulfate, aluminum nitrate, aluminum chloride, etc. The molecular ratio of the aluminum, expressed as alumina, is set forth here and in the appended claims and calculated in the oxide form.

The instant prepared aluminosilicate is useful in its hydrogen form as a catalyst in dewaxing a lubricating oil having an undesirable amount of wax content therein. The aluminosilicate has ancillary uses such as in separatory processes. It is contemplated that this aluminosilicate, when functioning in the hydrogen form as a catalyst, can adequately treat a lubricating oil of different viscosities ranging from 10 cp to about 80 cp measured at 40° C. while exhibiting the most beneficial properties of both ferrierite and ZSM-5. The lubricating oil has a boiling point of from 450° C. to 575° C. and the wax content comprises long chain paraffinic hydrocarbons which are selectively cracked to shorter chain hydrocarbons. The dewaxing will usually occur under dewaxing conditions in the presence of hydrogen including a temperature of about 250° C. to about 400° C. and a pressure of about 20 atmospheres to about 100 or more atmospheres. The throughput of the lubricating oil is usually between 0.2 LHSV and 5 LHSV, where one unit of LHSV is defined as one unit volume of oil per unit volume of catalyst per hour. This catalyst may also be used in independent parallel relationship with a ferrierite or ZSM-5 type catalyst.

EXAMPLES

Figure 1:
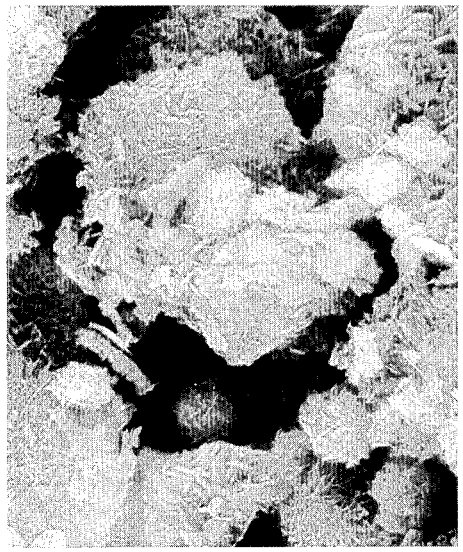
FIGS. 1 and 2 show a catalyst prepared using pyridine as the nitrogen-directing template under respective magnifications of 3000 and 10000 units.

The following examples are offered to exemplify the surprising increase in catalytic dewaxing activity resultant from substitution of the $C_6$ saturated heterocyclic nitrogen compound and sodium silicate respectively for the $C_6$ unsaturated heterocyclic nitrogen compound and silica gel of past crystallization recipes. This showing is a means to exemplify the unexpected catalytic activity of the combinative two zeolites derivative of this invention.

Three different aluminosilicate catalysts were prepared using different crystallizing admixtures as established in Tables I through III.

The prescribed silica or sodium silicate plus the amine and about one half the denoted water were stirred together in a large stainless steel beaker with agitation by means of an overhead stirrer. Acidic reagents (aluminum sulfate and sulfuric acid) plus the remaining water were added together in a teflon beaker until all of the salt dissolved. This latter acidic solution was then poured slowly into the former stirred basic solution. After passage of five minutes of stirring, the mixture was decanted into an autoclave. The mixture was thoroughly and vigorously stirred by twin three-bladed propellers. The mixture was held at a target temperature for a specified crystallization time. After cooling, the products were filtered on a Buchner funnel and rinsed with six liters of deionized distilled water, and let dry overnight at 125° C..

The resulting aluminosilicate was calcined to excise occluded amine molecules by heating at 470° C. in flowing air for one hour followed by heating at 570° C. for three hours in flowing air. This resulted in production of the calcined sodium-form of the aluminosilicate.

TABLE 1[4]

Ferrierite ZSM-5 Zeolite Prepared Using Sodium Silicate Piperidine and [n-Butylamine or TPAH]

| Alumino-silicate No. | Sodium Silicate | $Al_2O_3$ | $Na_2O$ | Water | Total Amine | Mole Ratio Piperidine to n-butylamine | TPAH | Temp. | Time | % F[2] | % Z[2] | S.A.[1] |
|---|---|---|---|---|---|---|---|---|---|---|---|---|
| 1 | 25.0 | 0.60 | 2.8 | 600 | 10 | — | 8.0 | 157° C. | 20 hrs. | 75 | 25 | 381 |
| 2 | 25.0 | 0.64 | 2.1 | 525 | 10 | 2.0 | — | 157° C. | 30 hrs. | 75 | 25 | 408 |
| 3 | 25.0 | 0.64 | 2.5 | 525 | 10 | 2.0 | — | 159° C. | 30 hrs. | 65 | 35 | 342 |
| 4 | 25.0 | 0.54 | 2.5 | 525 | 10 | 2.0 | — | 158° C. | 30 hrs. | 30 | 70 | 419 |

TABLE 2[B]

Ferrierite ZSM-5 Zeolite Prepared Using
Silica Gel, Pyridine and TPAH

| Alumino-silicate No. | $SiO_2$ | $Al_2O_3$ | $Na_2O$ | Water | Total Amine | Py/TPAH | Temp. | Time | % F[2] | % Z[3] | S.A.[1] |
|---|---|---|---|---|---|---|---|---|---|---|---|
| 5 | 25.0 | 0.27 | 2.0 | 518 | 8.0 | 150/1 | 160° C. | 75 hrs. | 80 | 20 | 351 |

TABLE 3[C]

ZSM-5 Prepared Using Sodium Silicate
Piperidine and n-Butylamine

| Alumino-silicate No. | $SiO_2$ | $Al_2O_3$ | $Na_2O$ | Water | Amine | Pip/n-but | Temp. | Time | % F[2] | % Z[1] | S.A.[1] |
|---|---|---|---|---|---|---|---|---|---|---|---|
| 6 | 25.0 | 0.27 | 2.5 | 525 | 10 | 2.0 | 162° C. | 30 hrs. | 0 | 100 | 418 |

[1] Low partial pressure $N_2$ sorption BET surface area
[2] Relative concentrations of ferrierite and ZSM-5 determined by quantitative X-ray powder diffraction analysis.
[A] Recipe is equal to silica/alumina/sodium oxide/water/amine (piperidine + TPAH or n-butylamine) = 25/xxx/yyy/525/9-11, the silica source being sodium silicate
[B] Recipe is equal to silica/alumina/sodium oxide/water/amine (pyridine + TPAH) moles = 25/xxx/yyy/518/8.0, the silica source being silica gel
[C] Recipe is equal to silica gel/alumina/sodium oxide/water/(piperdine and n-butyl amine = 25/xxx/yyy/525/10, the silica source being sodium silica The x-ray powder diffraction patterns are as follows in Tables 4, 5 and 6 with % F/ % Z representative of the ratio of ferrierite to ZSM-5 of the resultant aluminosilicate based on the intensities of the four major ferrierite X-ray diffraction reflections.

TABLE 4

% F/ % Z = 30/70
Aluminosilicate 4:
sodium silicate/alumina/piperidine/n-butylamine

| D[1] (Ang) | I[2] (Norm) |
|---|---|
| 11.24 | 31 |
| 10.15 | 21 |
| 9.53 | 21 |
| 7.51 | 2 |
| 7.13 | 3 |
| 6.98 | 4 |
| 6.77 | 3 |
| 6.64 | 4 |
| 6.43 | 4 |
| 6.03 | 6 |
| 5.77 | 5 |
| 5.62 | 8 |
| 5.17 | 3 |
| 5.00 | 5 |
| 4.67 | 5 |
| 4.40 | 12 |
| 4.29 | 10 |
| 4.00 | 40 |
| 3.95 | 23 |
| 3.84 | 100 |
| 3.78 | 56 |
| 3.74 | 66 |
| 3.67 | 42 |
| 3.55 | 33 |
| 3.48 | 35 |
| 3.40 | 10 |
| 3.33 | 19 |
| 3.26 | 3 |
| 3.15 | 9 |
| 3.07 | 17 |
| 3.00 | 17 |
| 2.90 | 4 |
| 2.75 | 3 |
| 2.62 | 6 |
| 2.57 | 3 |
| 2.50 | 6 |
| 2.41 | 6 |
| 2.36 | 2 |
| 2.24 | 1 |
| 2.15 | 1 |
| 2.12 | 2 |
| 2.02 | 18 |
| 2.00 | 23 |
| 1.96 | 4 |
| 1.93 | 12 |
| 1.87 | 6 |
| 1.84 | 2 |
| 1.78 | 8 |
| 1.71 | 2 |
| 1.67 | 9 |
| 1.61 | 2 |
| 1.57 | 2 |
| 1.53 | 2 |
| 1.49 | 5 |
| 1.47 | 9 |
| 1.45 | 6 |
| 1.43 | 9 |
| 1.40 | 6 |
| 1.39 | 2 |
| 1.37 | 2 |
| 1.31 | 1 |
| 1.27 | 3 |

[1] D = Crystallographic D spacing, in Angstroms
[2] I = Intensity of reflection, normalized to the most intense reflection (= 100)

TABLE 5

% F/ % Z = 86/20
Aluminosilicate 5:
Silica Gel/alumina/pyridine/TPAH

| D[1] (Ang) | I[2] (Norm) |
|---|---|
| 20.05 | 9 |
| 11.24 | 12 |
| 10.03 | 12 |
| 9.46 | 47 |
| 7.07 | 11 |
| 6.94 | 9 |
| 6.61 | 12 |
| 6.03 | 2 |
| 5.75 | 8 |
| 5.00 | 11 |
| 4.37 | 3 |
| 4.28 | 5 |
| 3.98 | 70 |
| 3.92 | 40 |
| 3.84 | 44 |
| 3.77 | 51 |
| 3.73 | 26 |
| 3.66 | 33 |
| 3.54 | 100 |

TABLE 5-continued

% F/ % Z ≃ 86/20
Aluminosilicate 5:
Silica Gel/alumina/pyridine/TPAH

| $D^1$ (Ang) | $I^2$ (Norm) |
|---|---|
| 3.47 | 87 |
| 3.37 | 22 |
| 3.32 | 32 |
| 3.21 | 17 |
| 3.13 | 24 |
| 3.05 | 16 |
| 2.95 | 12 |
| 2.89 | 7 |
| 2.84 | 6 |
| 2.70 | 3 |
| 2.65 | 7 |
| 2.47 | 5 |
| 2.40 | 5 |
| 2.35 | 4 |
| 2.25 | 3 |
| 2.14 | 4 |
| 2.02 | 12 |
| 1.99 | 19 |
| 1.92 | 16 |
| 1.86 | 11 |
| 1.83 | 11 |
| 1.80 | 2 |
| 1.77 | 14 |
| 1.74 | 4 |
| 1.70 | 4 |
| 1.66 | 7 |
| 1.62 | 3 |
| 1.60 | 2 |
| 1.57 | 3 |
| 1.48 | 8 |
| 1.46 | 10 |
| 1.42 | 16 |
| 1.41 | 13 |
| 1.39 | 4 |
| 1.36 | 6 |
| 1.34 | 3 |
| 1.31 | 4 |

[1] Crystallographic D spacing, in Angstroms
[2] I = Intensity of reflection, normalized to the most intense reflection (= 100)

TABLE 6

Nearly pure ZSM-5
Aluminosilicate 6:
Silica Gel/alumina/piperdine/(n-butylamine

| $D^1$ (Ang) | $I^2$ (Norm) |
|---|---|
| 11.17 | 32 |
| 10.03 | 18 |
| 9.78 | 6 |
| 7.45 | 2 |
| 6.74 | 3 |
| 6.38 | 5 |
| 6.02 | 6 |
| 5.73 | 5 |
| 5.60 | 6 |
| 5.39 | 2 |
| 5.17 | 3 |
| 5.00 | 3 |
| 4.63 | 8 |
| 4.38 | 13 |
| 4.28 | 13 |
| 4.11 | 2 |
| 4.02 | 5 |
| 3.87 | 100 |
| 3.83 | 73 |
| 3.76 | 38 |
| 3.73 | 54 |
| 3.66 | 31 |
| 3.49 | 7 |
| 3.45 | 12 |
| 3.37 | 6 |
| 3.32 | 12 |
| 3.26 | 4 |
| 3.15 | 3 |
| 3.06 | 13 |
| 2.99 | 15 |
| 2.95 | 6 |
| 2.87 | 3 |
| 2.79 | 2 |
| 2.74 | 4 |
| 2.69 | 1 |
| 2.62 | 5 |
| 2.52 | 3 |
| 2.50 | 6 |
| 2.43 | 3 |
| 2.40 | 4 |
| 2.33 | 1 |
| 2.24 | 1 |
| 2.21 | 2 |
| 2.08 | 2 |
| 2.02 | 17 |
| 2.00 | 17 |
| 1.96 | 4 |
| 1.92 | 6 |
| 1.88 | 6 |
| 1.83 | 2 |
| 1.77 | 3 |
| 1.77 | 3 |
| 1.76 | 4 |
| 1.72 | 1 |
| 1.68 | 7 |
| 1.66 | 7 |
| 1.63 | 2 |
| 1.61 | 1 |
| 1.57 | 2 |
| 1.52 | 1 |
| 1.51 | 1 |
| 1.49 | 5 |
| 1.47 | 9 |
| 1.45 | 9 |
| 1.44 | 4 |
| 1.43 | 7 |
| 1.41 | 5 |
| 1.40 | 7 |
| 1.39 | 4 |
| 1.37 | 3 |
| 1.35 | 1 |
| 1.33 | 3 |
| 1.31 | 1 |
| 1.28 | 1 |
| 1.27 | 1 |

[1] Crystallographic D spacing, in Angstroms
[2] I = Intensity of reflection, normalized to the most intense reflection (= 100)

Figure 2:
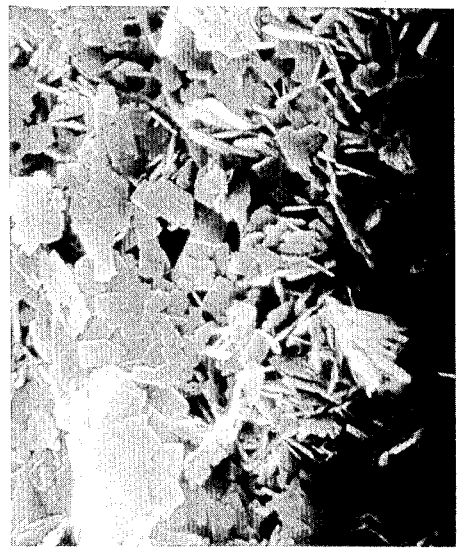
Figure 1A:
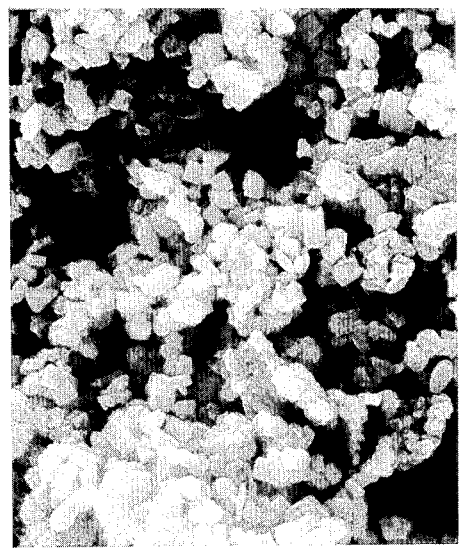
FIGS. 1A and 2A show a catalyst prepared using piperidine of this invention as the nitrogen-directing template under respective magnifications of 3000 and 1000 units.
Figure 2A:
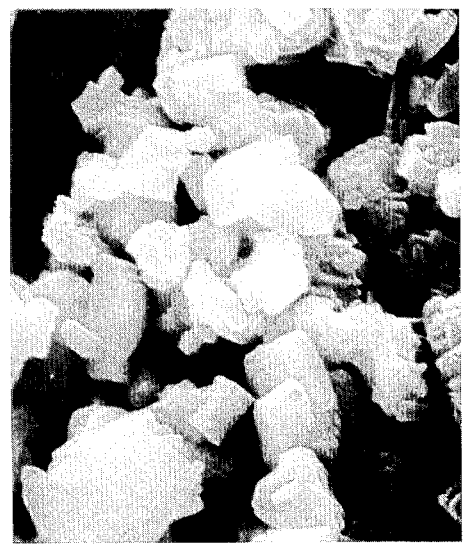

The aluminosilicates derived from Table I, aluminosilicates 1–4, are the products of this invention while aluminosilicates 5 and 6 are given for comparative purposes only. Examination of the morphology of aluminosilicate 1–4 (invention) versus aluminosilicate 5 was conducted by scanning electron microscopy (SEM). These results are shown X3000 for aluminosilicate 5 in FIG. 1 and X3000 for aluminosilicates 1–4 in FIG. 1A. Further magnification at X10000 for aluminosilicate 5 is shown in FIG. 2 and aluminosilicates 1–4 are shown in of FIG. 2A. Note the rather fine texture of the pyridine-silica gel derived aluminosilicates versus the "rock-and-boulder" texture of the piperidine-sodium silicate aluminosilicate of this invention.

All of the above prepared aluminosilicates were converted to the hydrogen form by calcination in air, then ammonium ion exchange with ammonium nitrate followed by calcination and impregnated with 0.2% w palladium and the resulting catalysts tested for catalytic activity and VI retention in dewaxing of two lubricating oils having the initial following properties in Tables 7 and 8.

TABLE 7

N—Methylpyrrolidone Extracted Hydrotreated Sweet/Sour (SSR) 100

| | |
|---|---|
| C % w | 86.06 |
| H % w | 13.85 |
| N ppm | 35 |
| S % w | 0.023 |
| Density G/cc | 0.8526 |
| Pour Point °F. | 65 |
| Viscosity 40° C. | 3.26 |
| Viscosity Index | 103 |
| Aromatic | 47.29 |

TABLE 8

N—Methylpyrrolidone Extracted Hydrotreated Sweet/Sour (SSR) 250

| | |
|---|---|
| C % w | 86.40 |
| H % w | 13.61 |
| N ppm | 29 |
| S % w | 0.028 |
| Density G/cc | 0.8672 |
| Pour Point °F. | — |
| DEG API | 31.5 |
| Viscosity 40° C. | 50.70 |
| Viscosity 100° C. | 7.04 |
| VI | 94 |

The SSR 100 oil of Table 7 and SSR oil of Table 8 have the following distillation gradients as set forth in Table 9.

TABLE 9

| | SSR 100 Distillation | SSR 250 Distillation |
|---|---|---|
| 5% | 641° F. | 725° F. |
| 10% | 660° F. | 770° F. |
| 20% | 684° F. | 802° F. |
| 30% | 700° F. | 823° F. |
| 40% | 715° F. | 842° F. |
| 50% | 730° F. | 863° F. |
| 60% | 742° F. | 882° F. |
| 70% | 757° F. | 902° F. |
| 80% | 773° F. | 928° F. |
| 85% | 792° F. | 963° F. |
| 95% | 804° F. | 995° F. |

The micro reactor conditions were $H_2$(lbs)/$H_2$ (standard cubic feet per barrel)/LHSV=400/5000/1.3. The following Tables 10 and 11 represent the results obtained. When processing a SSR 100 feedstock, catalysts derived by ion exchange of the aluminosilicate product of the instant invention (i.e. catalysts 1-4) exhibited an improved activity (average initial reactor temperature required to achieve 0° F. product pour point=511° F.) relative to the catalyst similarly prepared from silica gel and pyridine (i.e. catalyst 5, initial reactor temperature required to achieve 0° F. product pour point=572° F.). Moreover, catalysts prepared according to the instant invention exhibited improved product VI retention and product yield (average product VI, yield (%w) and yield (%v)=86, 83.0 and 82.0, respectively) relative to a ZSM-5 catalyst (i.e. catalyst 6) (product VI, yield (%w) and yield (%v)=83, 80.5 and 78.6, respectively). Moreover, catalysts prepared according to the instant invention exhibited lower production of low-valued gaseous hydrocarbon byproducts, i.e. $C_1$-$C_4$ make (average $C_1$-$C_4$ make=6.9% w) relative to the ZSM-5 catalyst ($C_1$-$C_4$ make=9.5% w).

When passing a sweet/sour 250 feedstock, catalysts derived from aluminosilicates of the instant invention (i.e. aluminosilicates 1-3) exhibit an improved activity (average initial reactor temperature required to achieve 5° F. product pour point=682° F.). Moreover, catalysts derived from aluminosilicates of the instant invention exhibit lower rates of activity decline=1.9° F./day relative to a ZSM-5 catalyst (i.e. catalyst 6) (rate of decline=6.3° F./day).

TABLE 10

SUMMARY OF MICROREACTOR TESTS RESULTS WITH SSR 100

| Aluminosilicate No. | % F | % Z | BET SA | Recipe[1,2] | Initial[3] Reactor Temp (°F.) 0° F. PP | VI | Product Yield[4] (650 + °F.) % w | % v | $C_1$-$C_4$ Yield % w |
|---|---|---|---|---|---|---|---|---|---|
| 1 | 75 | 25 | 381 | 25/0.60/3.5/600/10 | 505 | 87 | 81.7 | 80.9 | 7.3 |
| 2 | 75 | 25 | 408 | 25/0.64/2.0/525/10 | 523 | 85 | 84.3 | 83.5 | 6.4 |
| 3 | 65 | 35 | 342 | 25/0.64/2.8/525/10 | 512 | 86 | 85.4 | 84.6 | 7.6 |
| 4 | 30 | 70 | 419 | 25/0.54/2.8/525/10 | 505 | 87 | 82.4 | 81.7 | 6.2 |
| 5 | 80 | 20 | 351 | Silica Gel Py/TPAH = 150 | 572 | 85 | 85.3 | 84.5 | 7.4 |
| 6 | 0 | 100 | 418 | 25/0.27/2.5/525/10 | 511 | 83 | 80.5 | 78.6 | 9.5 |

[1] Mole ratios of recipe components expressed as silica/alumina/sodium oxide/water/total amine.
[2] Py = pyridine. TPAH = tetrapropylammonium hydroxide.
[3] Reactor temperature required to yield a product of oil pour point 0° F.
[4] Yield of dewaxed oil boiling above 650° F.

TABLE 11

SUMMARY OF MICROREACTOR TESTS RESULTS WITH SSR 250

| Aluminosilicate No. | % F | % Z | BET SA | Recipe[4] | Activity[1] deg F +5 PP | Activity[2] Decline deg F./day | VI | Product Yield[5] (650 + °F.) % w | % v | $C_1$-$C_4$ Yield % w |
|---|---|---|---|---|---|---|---|---|---|---|
| 1 | 65 | 35 | 342 | 25/0.64/2.8/525/10 | 592 | 2.8 | 86 | 80.8 | 79.2 | 14.2 |
| 2 | 45 | 55 | 391 | 25/0.74/2.8/525/10 | 587 | 0.8 | 84 | 76.5 | 75.0 | 16.2 |
| 3 | 30 | 70 | 419 | 25/0.54/2.8/525/10 | 554 | 2.1 | 88 | 81.0 | 79.6 | 11.4 |
| 5 | 45 | 55 | 366 | Silica Gel | 682 | >10 | 88 | 79.5 | 78.1 | 14.7 |

TABLE 11-continued
SUMMARY OF MICROREACTOR TESTS RESULTS WITH SSR 250

| Alumino-silicate No. | % F | % Z | BET SA | Recipe[4] | Activity[1] deg F +5 PP | Activity[2] Decline deg F./day | VI | Product Yield[5] (650 + °F.) % w | % v | $C_1$–$C_4$ Yield % w |
|---|---|---|---|---|---|---|---|---|---|---|
| 6 | 0 | 100 | 418 | 25/0.27/2.8/525/10 | 580 | 6.3 | 86 | 81.2 | 79.7 | 12.1 |

[1]Activity measured at catalyst age = 250–280 hrs; reactor temperature required to produce a product of pour point 5° F.
[2]Decline rate estimated over catalyst age range of ca. 200–400 hrs.
[3]Mean values for VI, Yields and $C_1$–$C_4$ estimated over catalyst age range of ca. 200–400 hrs.
[4]Mole ratios of recipe components expressed as silica/alumina/sodium oxide/water/total amine
[5]Yield of dewaxed oil boiling above 650° F.

What is claimed is:

1. A method of preparation of a combined ZSM-5 and ferrierite aluminosilicate which comprises crystallizing, at crystallization conditions, an aqueous crystallization admixture comprising sodium silicate, a compound of aluminum, sodium oxide, water and a combination of amines comprising piperidine and an aliphatic amine selected from the group consisting of n-butylamine, tetrapropylammonium hydroxide, and mixtures thereof, wherein said components are present in a content expressed by:

silica:alumina:sodium oxide:water:total amine
content equal to 25:XXX:YYY:350–2000:3–20 wherein XXX is equal to 0.1 to 2.0
wherein YYY is equal to 0.2 to 10 and
wherein the ratio of piperidine to said chosen aliphatic amine is equal to 0.1 to 20.

2. The method of preparation of claim 1 wherein crystallization conditions include a temperature of 125° C. to 225° C., a pressure of about 1 atmospheres to about 50 atmospheres and a period of time sufficient to effect said crystallization comprising 5 hours to 200 or more hours.

3. The method of preparation of claim 1 wherein said aliphatic amine is n-butylamine.

4. The method of preparation of claim 1 wherein said aliphatic amine is tetrapropylammonium hydroxide.

5. The method of claim 1 wherein said ratio of alumina (XXX) to 25 moles of silica is equal to 0.2 to 0.8 and said ratio of sodium oxide (YYY) to 25 moles of silica is equal to 0.5 to 5.0.

6. The method of claim 1 wherein said sodium oxide is formed by addition to the aqueous crystallization admixture of sodium hydroxide.

7. A method of preparation of an aluminosilicate mixture which comprises crystallizing, at crystallization conditions, an aqueous solution of sodium silicate, a compound of aluminum, sodium hydroxide, water, piperidine and n-butylamine in a ratio of 25:XXX:YYY:3-50–2000:3–20 wherein XXX is equal to 0.2 to 0.8 and YYY is equal to 0.5 to 5.0.

* * * * *